United States Patent [19]

Economy et al.

[11] Patent Number: 4,467,000

[45] Date of Patent: Aug. 21, 1984

[54] PROCESS FOR COATING A SUBSTRATE WITH POLYIMIDE

[75] Inventors: James Economy; Willi Volksen; Do Y. Yoon, all of San Jose, Calif.

[73] Assignee: International Business Machines Corporation, Armonk, N.Y.

[21] Appl. No.: 480,164

[22] Filed: Mar. 29, 1983

[51] Int. Cl.$^3$ .................... B05D 3/02; C08G 69/26
[52] U.S. Cl. .................. 427/385.5; 427/389.7; 428/473.5; 528/229; 528/353
[58] Field of Search ............ 427/385.5, 389.7; 428/473.5; 528/229, 353

[56] References Cited

U.S. PATENT DOCUMENTS

| | | | |
|---|---|---|---|
| 3,347,808 | 10/1967 | Lavin et al. | 260/29.1 |
| 3,565,549 | 2/1971 | Lubowitz et al. | 117/126 |
| 3,726,834 | 4/1973 | Acle, Jr. | 260/65 |
| 3,745,149 | 7/1973 | Serafini et al. | 260/65 |
| 3,998,786 | 12/1976 | D'Alelio | 528/229 X |

Primary Examiner—Michael R. Lusignan
Attorney, Agent, or Firm—Joseph G. Walsh

[57] ABSTRACT

A process for coating a substrate to provide good planarization and good mechanical and thermal stability, the process comprising applying to the substrate an amino-terminated oligomer and an ester, with the oligomer being formed from an aromatic diamine and from an aromatic dianhydride, and the ester being formed from an aromatic tetracarboxylic acid and an alcohol, and by reacting said oligomer and said ester in situ, with the process being characterized in that the ester reacts with an amine group of the oligomer to form a high molecular weight polyamide at a temperature between 40° C. and 140° C., and continues to react to form a cyclic imide.

8 Claims, No Drawings

PROCESS FOR COATING A SUBSTRATE WITH POLYIMIDE

DESCRIPTION

1. Technical Field

The present invention is concerned with a process for coating a substrate with a polyimide. The process is easily carried out to yield a coating simultaneously having good planarization and good mechanical and thermal stability.

2. Background Art

The prior art contains numerous references to polyimides used as coatings for substrates. In the past, however, it has not been possible to obtain coatings providing simultaneously ease of handling and good planarization on the one hand, and mechanical and thermal stability on the other hand.

U.S. Pat. No. 3,347,808 contains an extended discussion of the use of polyimide coatings. That patent, however, in no way suggests the use of esters such as those of the present invention.

U.S. Pat. No. 3,565,549 is concerned with reinforced laminates, and discloses the preparation of polyimide prepolymer and its subsequent curing. The patent lists numerous polyfunctional amines and polyfunctional anhydrides which may be used to prepare polyimides. The patent also summarizes much of the prior art. Nothing in the patent, however, suggests the esters of the present invention. The same is true about U.S. Pat. No. 3,745,149, which also shows curing of a prepolymer.

U.S. Pat. No. 3,726,834 is concerned with polyimides prepared from two or more aromatic diamines at least one of which is meta-substituted. Once again, that patent contains no teaching concerning the esters of the present invention.

DISCLOSURE OF THE INVENTION

According to the present invention, a substrate is coated by applying thereto an oligomer and an ester. The oligomer is an amino-terminated one, formed from an aromatic diamine and from an aromatic dianhydride. The ester is formed from an aromatic tetracarboxylic acid, and from certain alcohols. The novel feature of the present invention lies in the particular type of alcohol which is used and in the processing conditions. To obtain the desired results of ease of handling, good planarization and good thermal and mechanical stability, the ester must be one which reacts with an amine group of the amino terminated oligomer to form a high molecular weight polyamide at a temperature between 40° C. and 140° C., and which continues to react to form a cyclic imide.

The preferred esters which meet these requirements are those from alcohols which are activated by being substituted with an electron withdrawing group. The most preferred alcohols are CF₃—CH₂—OH and

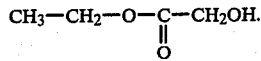

Other useful alcohols include, for example, hydroxyacetone, trichloroethanol, 1,3-difluoro-2-propanol, ethyl-2-hydroxyiso butyrate and diethyl tartronate, or in fact any alcohol which yields an ester which will react to form a polyamide within the range of 40°–140° C.

The aromatic tetracarboxylic acid portion of the ester may be from any of such acids known in the art, and shown, for example, in the patents referred to above. Preferred acids include pyromellitic acid and benzophenone tetracarboxylic acid.

In like manner, the aromatic diamine portion of the original reactants may be any of the aromatic diamine known to the art and referred to in the above patents. The most preferred material is oxydianiline.

In carrying out the process of the present invention, the prepolymer is preferably applied to the substrate in the form of a solution in a solvent. Useful solvents include, for example, polar organic solvents such as N-methyl pyrolidone, DMSO (Dimethylsulfoxide), Dimethyl acetamide, Dimethyl formamide and mixtures with other solvents.

When an oligomer of the proper type is used in the present invention at a temperature of from 40° C. to 140° C., there occurs a reaction between the ester and the amine group to form a high molecular weight polyamide, and reaction continues to form a cyclic imide. It is preferred that the oligomer have an initial molecular weight between 500 and 10,000, and most preferably between 1,000 and 5,000.

The following examples are given solely for the purpose of illustration and are not to be considered a limitation on the invention, many variations of which are possible without departing from the spirit or scope thereof.

TYPICAL PREPARATIONS OF PYROMELLITIC ACID DIESTERS

Ethylglycolate Diester 109.00 gm (0.50 mole) of finely divided, freshly sublimed pyromellitic dianhydride and 114.40 gm (1.10 mole) of ethyl glycolate were added to 600 ml of dichloromethane in a 1000 ml three-necked flask equipped with mechanical stirrer and a liquid addition funnel. The mixture was now rapidly stirred while 101.18 gm (1.00 mole) of freshly distilled triethylamine in 150 ml of dichloromethane was gradually added via the addition funnel. The slightly exothermic reaction mixture turned homogeneous within 30 minutes after the last of the triethylamine had been added. After a reaction time of 12 hours, the dichloromethane was removed by means of a rotary evaporator yielding the triethylammonium salt of the desired diester as a viscous, amorphous mass. This material was now dissolved in approximately 750 ml of distilled water and the solution gradually added to cold, dilute aqueous HCl causing the desired product to precipitate as a white, flocculant mass. This was immediately filtered and thoroughly washed with distilled water. Drying of the product in vacuo at 60 degrees C. for 24 hours gave the pyromellitic acid ethylglycolate diester in quantitative yield.

NMR characterization of the product in a mixture of deuterated chloroform and dimethylsulfoxide exhibited a multiplet at 8.2 ppm, a singlet at 4.8 ppm, a quartet at 4.2 ppm and a triplet at 1.2 ppm in the ratio of 1:2:2:3 in accordance with the projected spectrum of the desired product.

Trifluoroethyl Diester 32.4 gm (0.29 mole) of potassium t-butoxide was dissolved in 100 ml of tetrahydrofuran and 100 gm (1.00 mole) of trifluoroethanol. Next, 31.41 gm (0.144 mole) of finely divided, freshly sublimed pyromellitic dianhydrive was added in several portions to the externally cooled solution and the reaction stirred for 12 hours. The heterogeneous, white reaction slurry was then concentrated on a rotary evaporator and the diester salt dissolved in distilled water. The diester salt solution was now added gradually to a cold, dilute aqueous HCl solution causing the diester diacid to precipitate. The precipitate was immediately filtered and thoroughly washed with distilled water. The still wet precipitate was now dissolved in ethyl acetate, dried over calcium chloride, filtered and the ethyl acetate evaporated yielding the product as a finely divided white powder after vacuum drying at ambient temperature in 65% yield.

NMR characterization of the reaction product in a mixture of deuterated chloroform/dimethylsulfoxide exhibited the characteristic multiplet at 8.2 ppm and a quarter at 4.8 ppm in the ratio of 1:2 in accordance with the projected spectrum for this compound.

Ethyl Lactate Diester 15.5 gm (0.07 mole) of finely divided, freshly sublimed pyromellitic dianhydride was suspended in 75 ml of dichloromethane containing 17.7 gm (0.15 mole) of freshly distilled ethyl lactate in a 250 ml three-necked flask equipped with mechanical stirrer and a liquid addition funnel. Next, 14.4 gm (0.142 mole) of triethylamine in 125 ml dichloromethane was gradually added via the addition funnel yielding a homogeneous solution 30 minutes after the last of the triethylamine solution had been added. Stirring was continued for another 12 hours at ambient conditions and then the dichloromethane was removed on a rotary evaporator. The amorphous residue was dissolved in 250 ml of distilled water and added to a cold, dilute aqueous HCl solution causing the precipitation of a non-crystalline material. The supernatant was decanted and thoroughly extracted with diethyl ether and the remaining amorphous precipitate also dissolved in diethyl ether. The ether fractions were combined and dried over calcium chloride. Filtration and evaporation of the diethyl ether gave an off-white crystalline material in approximately 60% yield.

NMR characterization of the product in a mixture of deuterated chloroform/dimethylsulfoxide exhibited a multiplet at 8.1 ppm, a quartet at 5.2 ppm, in the ratio of 2:1:2:3:3 consistent with the projected spectrum of the desired product.

Isoamyl Diester 109.0 gm (0.50 mole) of finely divided, freshly sublimed pyromellitic dianhydride was added to 750 ml of isoamyl alcohol in a 1000 ml flask equipped with a reflux condenser. Upon heating the reaction mixture slowly became homogeneous and refluxing was continued for another 4 hours. At this point, the reaction was allowed to reach ambient temperature and the isoamyl alcohol was removed via a rotary evaporator to give a white residue which after drying in vacuo at approximately 80 degrees C. was obtained in quantitative yield.

NMR characterization of the product in deuterated acetone exhibited a multiplet at 8.1 ppm, a multiplet at 4.3 ppm, and a multiplet of peaks at 1.7 and 1.0 ppm in the ration of 1:2:3:6 in accordance with the desired structure.

Preparation of PMDA-ODA Based Amino Terminated Amic-Acid Oligomers

Amino-Terminated Oligomer ($\overline{DP}=5$)

($\overline{DP}$ refers to the degree of polymerization and is the number of amide bonds per oligomer unit.) 120.15 gm (0.60 mole) of highly purified oxydianiline was dissolved in 600 ml of freshly distilled N-methylpyrolidone in a 1000 ml resin kettle equipped with mechanical stirrer, thermocouple well, and a solid addition funnel. Once dissolution of the diamine was complete, 87.25 gm (0.40 mole) of finely divided, highly purified pyromellitic dianhydride was added to the diamine solution via the solid addition funnel over a period of 2-3 hours. During these operations, stirring of the polymerization mixture was vigorous and was continued for 3 days until the polymerization mixture had become homogeneous. The resulting viscous solution was next aged for 2 weeks at ambient temperature, sealed in sample bottles and stored in the refrigerator. All operations were performed under the exclusion of moisture and oxygen in an environmental chamber, yielding the oligomer solution ready for further formulation with the diester at a total solids content of approximately 25 wt %.

Amino-Terminated Oligomer ($\overline{DP}=2.5$)

40.0 gm (0.20 mole) of freshly sublimed oxydianiline was dissolved in 500 ml of distilled N-methylpyrolidone and 18.0 gm (0.0825 mole) of highly purified pyromellitic dianhydride was gradually added to the vigorously stirred diamine solution via a solid addition funnel. The reaction was stirred for another 12 hours after dissolution of the pyromellitic dianhydride was complete and then the oligomer was precipitated in diethyl ether. The mixture was filtered and the resulting light yellow powder dried in vacuo at 50 degrees C. for 24 hours. The dry oligomer powder could be dissolved in N-methylpyrolidone to yield the desirable solids content.

Preparation of Chain-Extendable PMDA-ODA Oligomer Formulation

Isoamyl Diester Formulation 50 gm of a 25 wt % oligomer solution with $\overline{DP}=5$ was formulated with 3.91 gm (0.0121 mole) of isoamyl diester, sealed under helium, and stored in the refrigerator.

Ethyl Glycolate Diester Formulation 5.16 gm (0.0121 mole) of ethyl glycolate diester was dissolved in 50 gm of a 25 wt% oligomer solution with $\overline{DP}=5$, sealed under helium, and stored in the refrigerator.

Trifluoroethyl Diester Formulation 5.06 gm (0.0121 mole) of trifluoroethyl diester was dissolved in 50 gm of a 25 wt% oligomer solution with $\overline{DP}=5$, sealed under helium, and stored in the refrigerator.

Curing of Chain-Extendable PMDA-ODA Formulations

The above illustrated formulations were spun-cast onto glass slides and cured to elevated temperatures (300 degrees C.) under a nitrogen atmosphere. The curing temperature profile started at 50° C. and proceeded at 5°/min to 100° C. where the temperature was held for one hour. Next, the specimen was heated to 135° C. at 5°/min and held at this temperature for two hours. Finally, the temperature was slowly raised at 0.5°/min to a final temperature of 400° C. Removal of the cured films from the glass substrate and examination of the films by IR spectroscopy revealed spectra identical to the polyimide obtained from thermally curing high molecular weight polyamic-acid based on the same monomers (pyromellitic dianhydride and oxydianiline).

Mechanical and Thermal Properties of Chain-extended PMDA-ODA Formulations

The following table shows the properties of the formulations.

Sample No. 1 is a commercially available high molecular weight polyamic acid based on PMDA-ODA pyromellitic dianhydride and oxydianiline, included for purposes of comparison.

Sample No. 2 is the formulation based on ethyl glycolate, as prepared above.

Sample No. 3 is the formulation based on trifluroethanol, as prepared above.

Sample No. 4 is the formulation based on iso-amyl alcohol, and is included for purposes of comparison.

COMPARISON OF MECHANICAL PROPERTIES

| Sample # | Coating Quality | $\sigma \times 10^4$ (lbs/sq.in.) | $\epsilon$ (%) |
|---|---|---|---|
| 1 | Excellent flexible thick films | 2.0 | 55 |
| 2 | Excellent flexible thick films | 1.6 | 30 |
| 3 | Excellent flexible thick films | 2.3 | 55 |
| 4 | good flexible thin films | too thin to measure | |

Thermal Stability

All samples showed less than 0.4% weight loss after 15 hours at 400° C.

We claim:

1. A process for coating a substrate, said process comprising the steps of:
    (1) applying to said substrate a solution of an amino-terminated oligomer and an ester, the oligomer being formed from an aromatic diamine and from an aromatic dianhydride and the ester being formed from an aromatic tetracarboxylic acid and an alcohol,
    (2) reacting said oligomer and said ester in situ at a temperature between 40° C. and 140° C. so that the ester reacts with an amine group of the oligomer to form a high molecular weight polyamide,
    (3) continuing the reaction until a cyclic imide is formed, and
    (4) curing the coating by the application of heat.

It is respectfully requested that the above-identified application be reexamined in view of the foregoing amendment and the following remarks.

2. A process as claimed in claim 1 wherein the ester is one formed from the alcohol $CF_3-CH_2-OH$.

3. A process as claimed in claim 1 wherein the ester is one formed from the alcohol

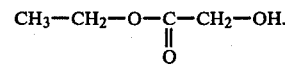

4. A process as claimed in claim 1 wherein the aromatic tetracarboxylic acid is pyromellitic acid.

5. A process as claimed in claim 1 wherein the aromatic tetracarboxylic acid is benzophenone tetracarboxylic acid.

6. A process as claimed in claim 1 wherein the diamine is oxydianiline.

7. A process as claimed in claim 1 wherein the oligomer has an initial molecular weight of from 500 to 10,000.

8. A process as claimed in claim 1 wherein the oligomer has an initial molecular weight of from 1,000 to 5,000.

* * * * *